United States Patent
Yamazaki

(10) Patent No.: US 9,702,171 B2
(45) Date of Patent: Jul. 11, 2017

(54) LOCKING DEVICE

(71) Applicant: SHIROKI CORPORATION, Fujisawa-shi (JP)

(72) Inventor: Takuji Yamazaki, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 26 days.

(21) Appl. No.: 14/768,219

(22) PCT Filed: Feb. 14, 2014

(86) PCT No.: PCT/JP2014/053416
§ 371 (c)(1),
(2) Date: Aug. 15, 2015

(87) PCT Pub. No.: WO2014/129388
PCT Pub. Date: Aug. 28, 2014

(65) Prior Publication Data
US 2015/0376919 A1    Dec. 31, 2015

(30) Foreign Application Priority Data
Feb. 20, 2013  (JP) ................................ 2013-030639

(51) Int. Cl.
*A47B 97/00*    (2006.01)
*E05B 85/26*    (2014.01)
(Continued)

(52) U.S. Cl.
CPC .......... *E05B 85/26* (2013.01); *B60N 2/01583* (2013.01); *B60N 2/366* (2013.01); *E05B 85/243* (2013.01)

(58) Field of Classification Search
USPC ...................................................... 248/503.1
See application file for complete search history.

(56) References Cited

U.S. PATENT DOCUMENTS 3,594,032 A * 7/1971 Lampe .................. E05B 85/243
                                                292/280
4,067,611 A * 1/1978 Kurozu .................. B60N 2/366
                                                297/354.12
(Continued)

FOREIGN PATENT DOCUMENTS

DE    10 2009 029 031 A1    3/2011
DE    10 2009 029 041 A1    3/2011
(Continued)

OTHER PUBLICATIONS

International Search Report (ISR) (PCT Form PCT/ISA/210), in PCT/JP2014/053416, dated Apr. 8, 2014.
(Continued)

*Primary Examiner* — Monica Millner
(74) *Attorney, Agent, or Firm* — McGinn IP Law Group, PLLC

(57) ABSTRACT

Provided is a locking device, the fastening strength of which does not vary. A hook is provided with a recess having a first stopper surface and a second stopper surface which extend in the direction of a rotating shaft. A pawl is provided with a projection having a first contact surface capable of contacting the first stopper surface, and a second contact surface capable of contacting the second stopper surface. The provided locking device is one in which the first and second contact surfaces are convexly curving surfaces which project outward toward the first and second stopper surfaces.

7 Claims, 6 Drawing Sheets

(51) Int. Cl.
  *B60N 2/015* (2006.01)
  *E05B 85/24* (2014.01)
  *B60N 2/36* (2006.01)

(56) References Cited

U.S. PATENT DOCUMENTS

| | | | | |
|---|---|---|---|---|
| 4,988,135 A * | 1/1991 | Ottino | ................... | E05B 81/20 292/201 |
| 5,154,476 A * | 10/1992 | Haider | ................ | B60N 2/2352 297/367 R |
| 5,544,925 A * | 8/1996 | Ikeda | ................ | E05B 17/0012 292/216 |
| 5,577,782 A * | 11/1996 | Johnson | ................ | E05B 81/06 292/201 |
| 6,059,327 A * | 5/2000 | Yoshikuwa | ............ | E05B 83/16 292/216 |
| 6,974,173 B2 * | 12/2005 | Yokoyama | ........ | B60N 2/01583 248/503.1 |
| 7,066,549 B2 * | 6/2006 | Dennon | .................. | A61G 5/10 297/354.12 |
| 7,210,714 B2 * | 5/2007 | Berghahn | ................ | E05B 81/20 292/201 |
| 7,226,129 B2 * | 6/2007 | Brandes | ................ | B60N 2/366 296/65.01 |
| 7,380,844 B2 * | 6/2008 | Berghahn | ................ | E05B 81/20 292/201 |
| 7,431,371 B2 * | 10/2008 | Miller | ............... | B60N 2/01583 296/65.03 |
| 7,762,605 B2 * | 7/2010 | Otsuka | .............. | B60N 2/01583 248/503.1 |
| 9,279,277 B2 * | 3/2016 | Spurr | ..................... | E05B 81/14 292/195 |
| 9,500,012 B2 * | 11/2016 | He | .......................... | E05C 19/12 |
| 2009/0056393 A1 * | 3/2009 | Otsuka | ............... | B60N 2/01583 70/205 |
| 2009/0151257 A1 * | 6/2009 | Dominique | ............. | E05B 81/20 49/280 |
| 2009/0199605 A1 * | 8/2009 | Spurr | ..................... | E05B 81/14 70/266 |
| 2010/0127511 A1 * | 5/2010 | Vasquez | .................. | E05B 81/06 292/201 |
| 2010/0133412 A1 * | 6/2010 | Imajo | ................. | B60N 2/01583 248/503.1 |
| 2011/0204660 A1 * | 8/2011 | Cumbo | ................. | E05B 85/243 292/217 |
| 2014/0103666 A1 | 4/2014 | Yamazaki | | |

FOREIGN PATENT DOCUMENTS

| | | |
|---|---|---|
| JP | 2004-238841 A | 8/2004 |
| JP | 2005-329804 A | 12/2005 |
| JP | 2009-214858 A | 9/2009 |
| JP | 4325794 B2 | 9/2009 |
| JP | 2013-002135 A | 1/2013 |

OTHER PUBLICATIONS

Japanese Office Action dated Feb. 7, 2016 with an English translation thereof.

* cited by examiner

FIG.6  -PRIOR ART-
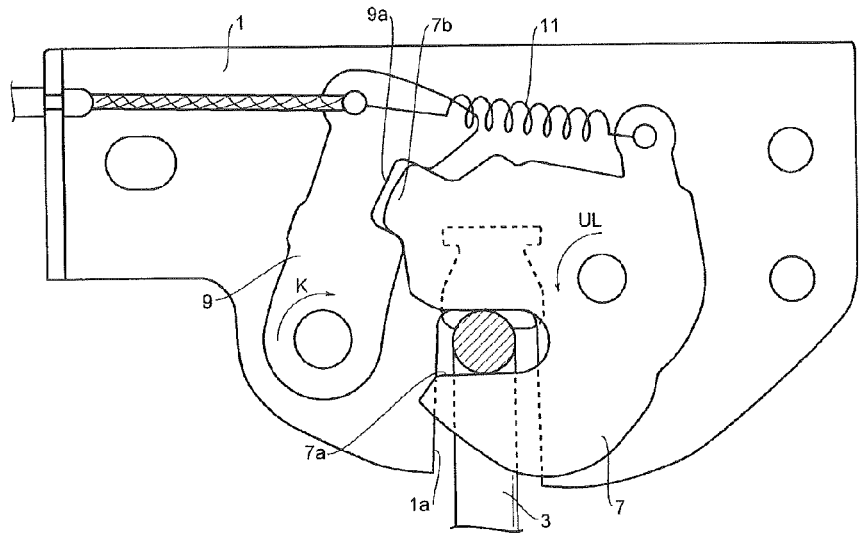
FIG.7  -PRIOR ART-
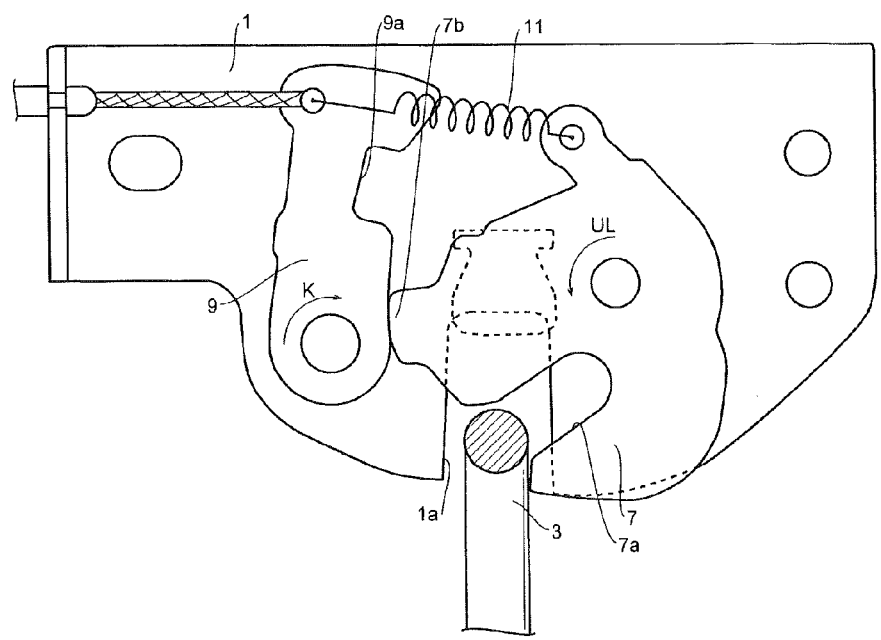

LOCKING DEVICE

TECHNICAL FIELD

The present invention relates to a locking device.

BACKGROUND ART

An example of a background locking device will be described with reference to FIGS. 6 and 7. FIG. 6 is a view showing a locked state of the background locking device, and FIG. 7 is a view showing an unlocked state of the background locking device.

The locking device is attached to each of a moving-side member and a fixed-side member. The moving-side member is, for example, a seat, a door, a trunk lid or an engine hood, which is provided to be rotatable relative to a floor of a vehicle. The fixed-side member is, for example, a vehicle body. The locking device is a device that is capable of suppressing the relative movement between the moving-side member and the fixed-side member.

The locking device includes a base 1 and a striker 3. The base 1 is provided in one of the moving-side member and the fixed-side member, and the striker 3 is provided in the other one. The base 1 is provided with a groove 1a into which the striker 3 is able to enter.

A hook 7 is rotatably provided in one side of the base 1. A pawl 9 is rotatably provided in the other side of the base 1. The groove 1a is provided between one side and the other side of the base 1. The hook 7 is formed with a groove 7a into which the striker 3 is able to enter. The hook 7 is formed with a convex portion 7b.

The pawl 9 is formed with a concave portion 9a with which the convex portion 7b of the hook 7 can be engaged. The concave portion 9a has a shape that is spread toward its opening.

A spring 11 is caused to exert a force on the hook 7 and the pawl 9. One end of the spring 11 is locked to the hook 7, and the other end thereof is locked to the pawl 9. The spring 11 urges the hook 7 in an unlocked position direction (in the drawing, a direction of an arrow UL). The spring 11 urges the pawl 9 in a direction (in the drawing, a direction of an arrow K) in which the convex portion 9a is engaged with the concave portion 7b of the hook 7.

In the state shown in FIG. 6, the hook 7 is in a locked position where the striker 3 is prohibited from being detached from the groove 7a. This state is a locked state where the concave portion 9a is engaged with the convex portion 7b, and the rotation of the hook 7 is thus prohibited.

In the state shown in FIG. 7, the engagement between the concave portion 9a and the convex portion 7b is released. This state is an unlocked state where the hook 7 is in an unlocked position and where the striker 3 is able to enter the groove 7a.

Next, an operation of the locking device configured as described above will be described.

When the pawl 9 is rotated, from the locked state shown in FIG. 6, in a direction opposite to the direction of the arrow K against an elastic force of the spring 11, the engagement between the concave portion 9a and the convex portion 7b is released. The hook 7 is further rotated, by the elastic force of the spring 11, to the unlocked position where the striker 3 is able to enter the groove 7a. In this way, the locking device becomes the unlocked state shown in FIG. 7, where the convex portion 7b is abutted against a portion other than the concave portion 9a.

In the unlocked state shown in FIG. 7, the hook 7 is rotated in the locked position direction against the elastic force of the spring 11 when a surface in the vicinity of an opening of the groove 7a of the hook 7 is pressed by the striker 3. Further, the convex portion 7b of the hook 7 and the concave portion 9a of the pawl 9 are engaged, and the hook 7 is thus prohibited from rotating in the unlock direction. Then, the striker 3 becomes the locked state where the striker 3 is not able to be detached from the groove 7a of the hook 7 (e.g., see Patent Literature 1).

CITATION LIST

Patent Literature

Patent Literature 1: Japanese Patent Publication No. 4325794

SUMMARY OF THE INVENTION

Problem to be Solved

In the locking device configured as described above, due to variations in the dimensional accuracy or assembly accuracy of the hook 7 or the pawl 9, the contact position between the convex portion 7b and the concave portion 9a is varied when the convex portion 7b enters the concave portion 9a. For example, an entry depth of the convex portion 7b into the concave portion 9a becomes shallow if the convex portion 7b is greater than its original shape. Therefore, the engagement strength between the hook 7 and the pawl 9 is varied, and thus there is a possibility that a sufficient engagement strength is not obtained. Therefore, the present invention is to provide a locking device where the engagement strength is hard to be varied.

Solution to Problem

According to the present invention, there is provided a locking device including a base; a hook provided on the base so as to be rotatable around a rotation axis; and a pawl provided on the base so as to be rotatable around an axis parallel to the rotation axis, wherein the hook has a groove into which a striker is able to enter, the hook is rotatable from an unlocked position where the striker is able to enter the groove to a locked position where the striker is prohibited from being detached from the groove, and the hook is pressed in the unlocked position direction, wherein the pawl prohibits the rotation of the hook by being in contact with the hook located in the locked position, and the pawl is pressed in a direction to be urged against the hook, wherein a concave portion is provided in one of the hook and the pawl and has a first stopper surface and a second stopper surface facing the first stopper surface which are extending in the rotation axis direction, wherein a convex portion is provided in the other of the hook and the pawl and has a first contact surface that can be brought into contact with the first stopper surface and a second contact surface that can be brought into contact with the second stopper surface, wherein when the convex portion enters the concave portion, the first contact surface is brought into contact with the first stopper surface and the second contact surface is brought into contact with the second stopper surface, so that the rotation of the hook is prohibited by the pawl, and wherein the first contact surface is a convex curved surface projected toward the first stopper surface, and the second contact surface is a convex curved surface projected toward the second stopper surface, as seen from the rotation axis direction.

Effects of Invention

According to the present invention, a locking device where the engagement strength is hard to be varied is provided.

BRIEF DESCRIPTION OF THE DRAWINGS

FIG. 6 is a configuration view showing a locked state of a background locking device.

FIG. 7 is a configuration view showing an unlocked state of the background locking device.

DESCRIPTION OF EMBODIMENTS

Figure 1:
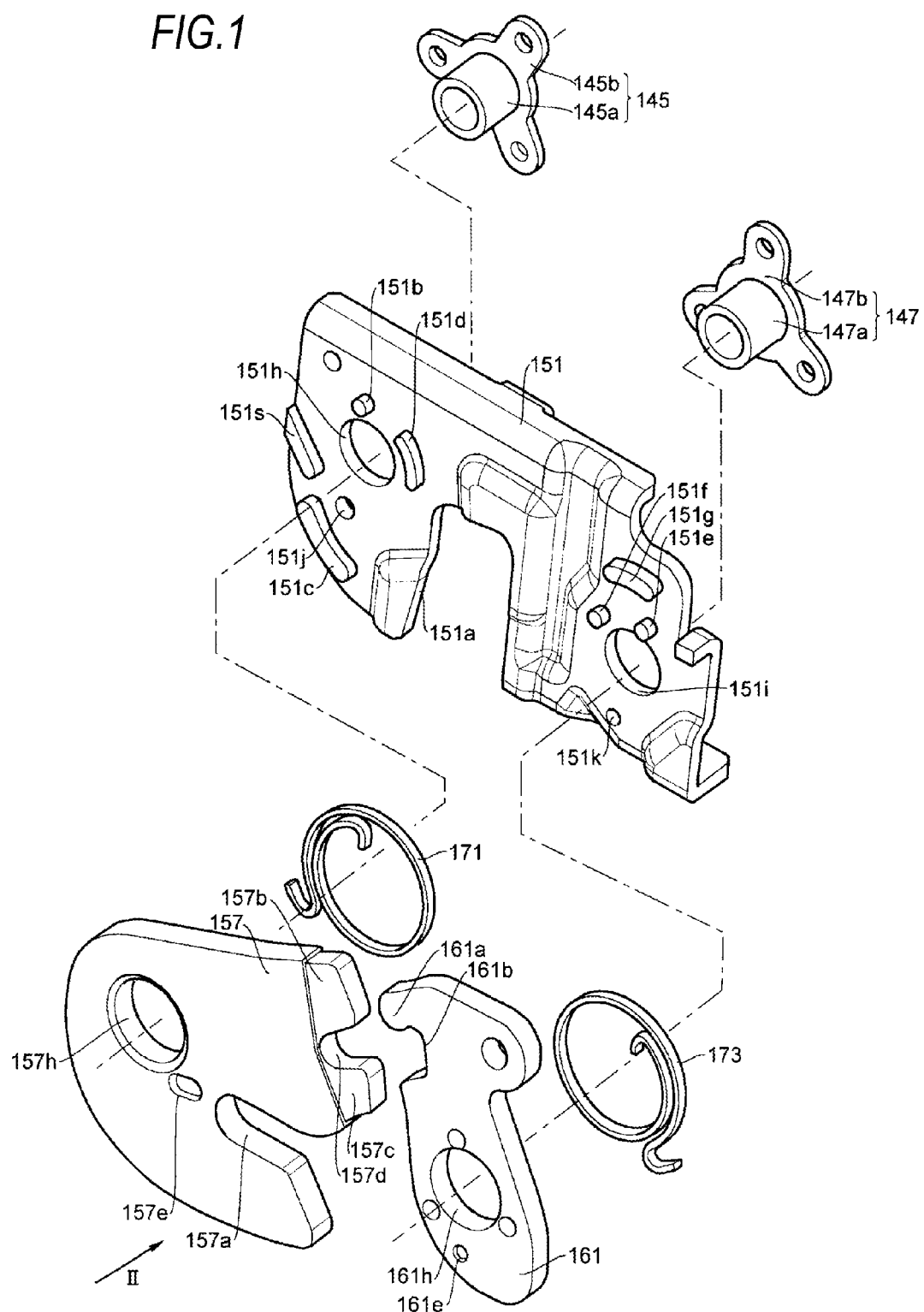
FIG. 1 is an exploded perspective view of a locking device of an illustrative embodiment.
Figure 2:
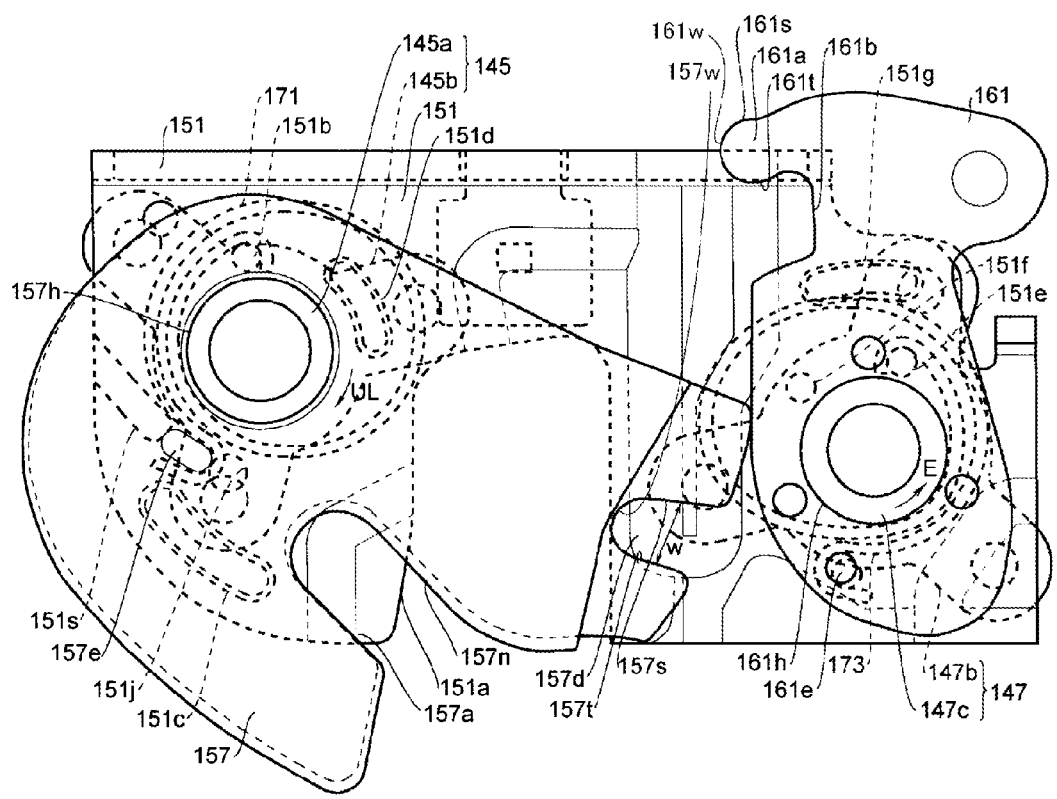
FIG. 2 is a view showing an unlocked state of the locking device shown in FIG. 1, as seen from II direction in FIG. 1.
Figure 3:
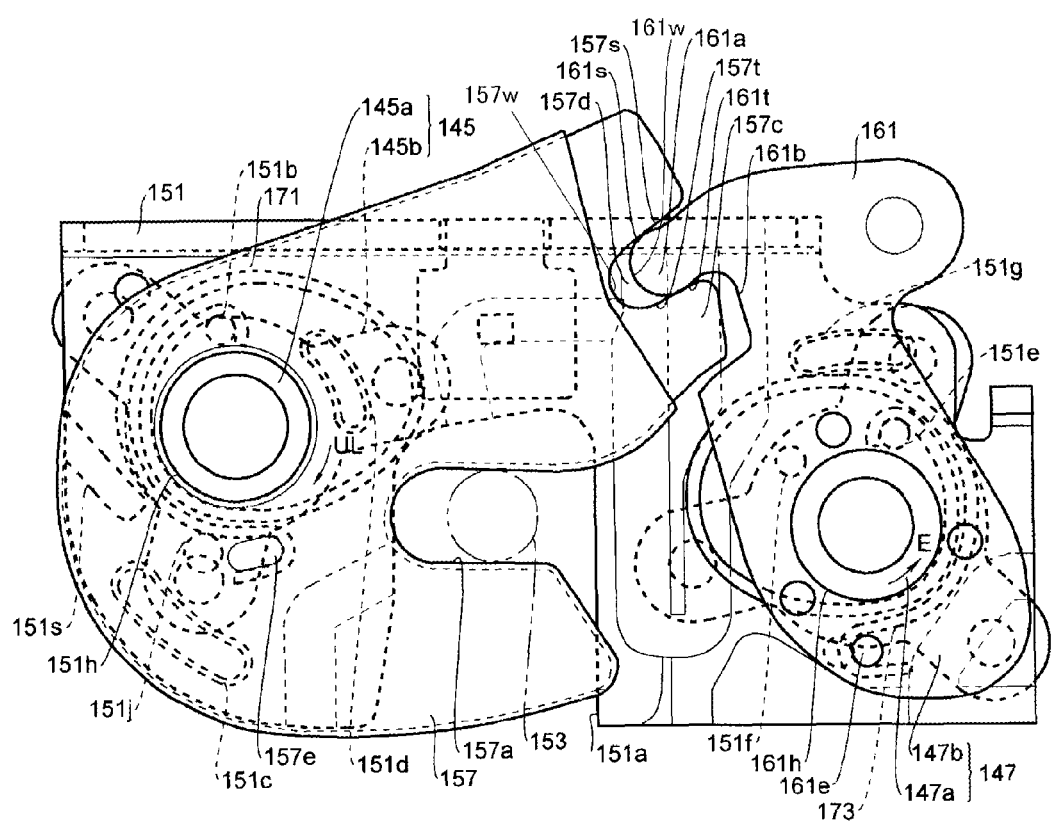
FIG. 3 is a view showing a locked state of the locking device shown in FIG. 2.

An illustrative embodiment of the present invention will be described with reference to the drawings. FIG. 1 is an exploded perspective view of a locking device of an illustrative embodiment. FIG. 2 is a view showing an unlocked state of the locking device shown in FIG. 1, as seen from II direction in FIG. 1. FIG. 3 is a view showing a locked state of the locking device shown in FIG. 2.

The locking device is attached to each of a moving-side member and a fixed-side member. The moving-side member is, for example, a seat, a door, a trunk lid or an engine hood, which are provided to be rotatable relative to a floor of a vehicle. The fixed-side member is, for example, a vehicle body. The locking device is a device that is capable of suppressing the relative movement between the moving-side member and the fixed-side member.

The locking device includes a base 151 and a striker 153 (see FIG. 3). The base 151 is attached to one of the moving-side member and the fixed-side member, and the striker 153 is attached to the other of the moving-side member and the fixed-side member. The base 151 is provided with a groove 151*a* into which the striker 153 is able to enter. The base 151 includes a hook 157 and a pawl 161. The hook 157 and the pawl 161 are provided on the base 151 so as to be rotatable around rotation axes parallel to each other.

As shown in FIG. 1, the base 151 is a substantially plate-like member having a front surface and a back surface. The base 151 has a right portion and a left portion, which are provided across the groove 151*a*.

A hook 157 is provided on the front surface of the left portion of the base 151. The hook 157 is formed with a through hole 157*h*. Furthermore, the base 151 is also formed with a through hole 151*h*. A diameter of the hole 151*h* is set to be substantially equal to a diameter of the hole 157*h* of the hook 157.

A bushing 145 is provided on the back surface of the base 151. The bushing 145 has a cylindrical portion 145*a* that is inserted into the hole 151*h* of the base 151, and an attaching portion 145*b*. The attaching portion 145*b* is formed in a base portion of the cylindrical portion 145*a*. An outer diameter of the cylindrical portion 145*a* that is abutted against the back surface of the base 151 is set to be slightly smaller than those of the hole 157*h* of the hook 157 and the hole 151*h* of the base 151.

The cylindrical portion 145*a* is inserted through the hole 151*h* of the base 151 and the hole 157*h* of the hook 157. A leading end of the cylindrical portion 145*a*, which has passed through the hole 157*h* of the hook 157, is crimped. Therefore, the hook 157 is rotatable relative to the base 151.

In the present embodiment, the position of the hook 157 shown in FIG. 2 is defined as an unlocked position, and the position of the hook 157 shown in FIG. 3 is defined as a locked position.

The pawl 161 is rotatably provided on the front surface of the right portion of the base 151. The pawl 161 is formed with a through hole 161*h*. The base 151 is also formed with a through hole 151*i*. A diameter of the hole 151*i* is set to be substantially equal to a diameter of the hole 161*h* of the pawl 161.

A bushing 147 is provided on the back surface of the base 151. The bushing 147 has a cylindrical portion 147*a* that is inserted into the hole 151*i* of the base 151, and an attaching portion 147*b*. The attaching portion 147*b* is formed in a base portion of the cylindrical portion 147*a* and abutted against the back surface of the base 151. An outer diameter of the cylindrical portion 147*a* is set to be slightly smaller than those of the hole 161*h* of the pawl 161 and the hole 151*i* of the base 151.

The cylindrical portion 147*a* is inserted through the hole 151*i* of the base 151 and then inserted through the hole 161*h* of the pawl 161. Further, a leading end of the cylindrical portion 147*a*, which has passed through the hole 161*h* of the pawl 161, is crimped. Therefore, the pawl 161 is rotatable relative to the base 151.

The hook 157 is formed with a groove 157*a* into which the striker 153 is able to enter. Further, on a peripheral portion of the hook 157, a first convex portion 157*b* and a second convex portion 157*c* are formed along a rotation direction of the hook 157 into the unlocked position. A concave portion 157*d* is formed between the first convex portion 157*b* and the second convex portion 157*c*. The concave portion 157*d* has a shape that is spread toward its opening. A width w (see FIG. 2) of the concave portion 157*d* is gradually thinned toward the inside from a peripheral surface.

A convex portion 161*a* is formed on a surface of the pawl 161 facing the hook 157. The convex portion 161*a* can be locked/unlocked from the concave portion 157*d* of the hook 157. Further, a concave portion 161*b*, into which the second convex portion 157*c* of the hook 157 is able to enter, is formed on a surface of the pawl 161 facing the hook 157. *

A spring 171 for urging the hook 157 in the unlocked position direction (a direction of an arrow UL in FIGS. 2 and 3) is provided between the base 151 and the hook 157. Further, a spring 173 for urging the pawl 161 in a direction (a direction of an arrow E in FIGS. 2 and 3) to be engaged with the hook 157 is provided between the base 151 and the pawl 161. In the present embodiment, the springs 171, 173 are spiral springs.

Next, shapes of the concave portion 157*d* and the convex portion 161*a* will be described.

The concave portion 157*d* of the hook 157 has a first stopper surface 157*s* extending in a rotation axis direction of the hook 157 and a second stopper surface 157*t* facing the first stopper surface 157*s*. The rotation axis direction of the hook 157 is a direction perpendicular to a paper surface of FIGS. 2 and 3. The rotation direction of the hook 157 is the direction of the arrow UL and an opposite direction thereof in FIGS. 2 and 3. The first stopper surface 157s and the second stopper surface 157t are opposed to each other via a space. The first stopper surface 157s and the second stopper surface 157t are planar surfaces. The first stopper surface 157s is inclined with respect to the second stopper surface 157t such that the concave portion 157d is spread toward its opening.

Figure 4:
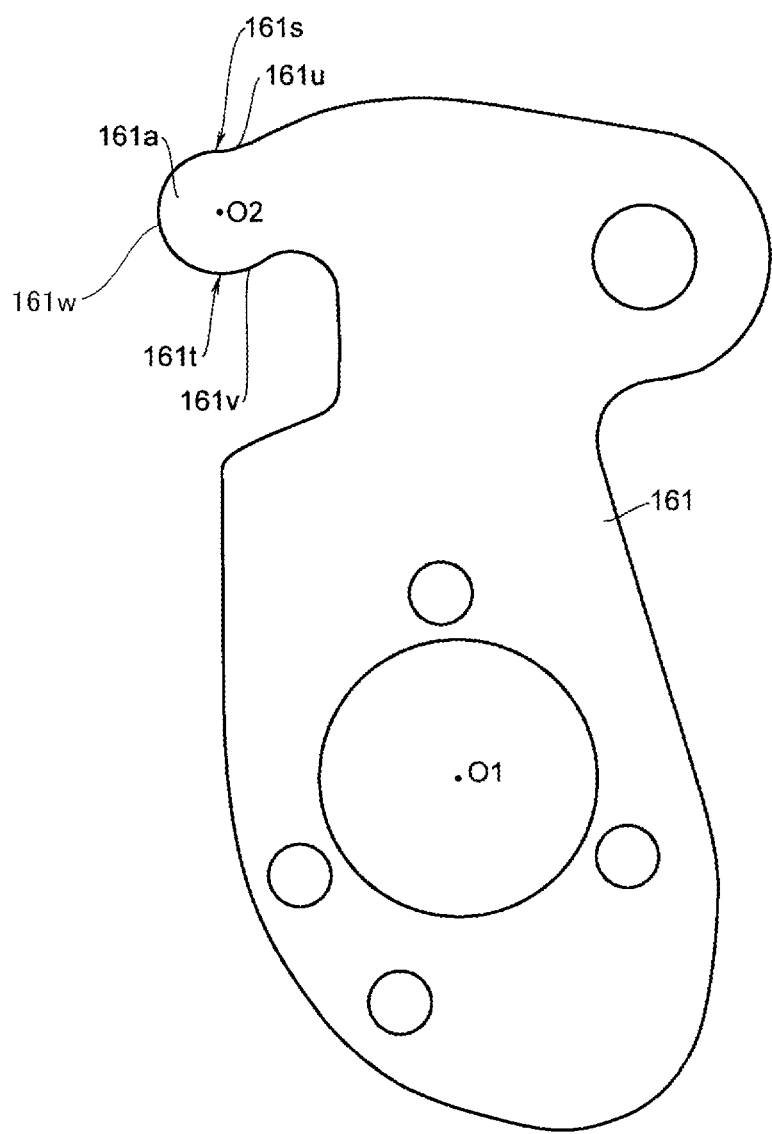
FIG. 4 is an enlarged view of a pawl shown in FIG. 1.
Figure 5:
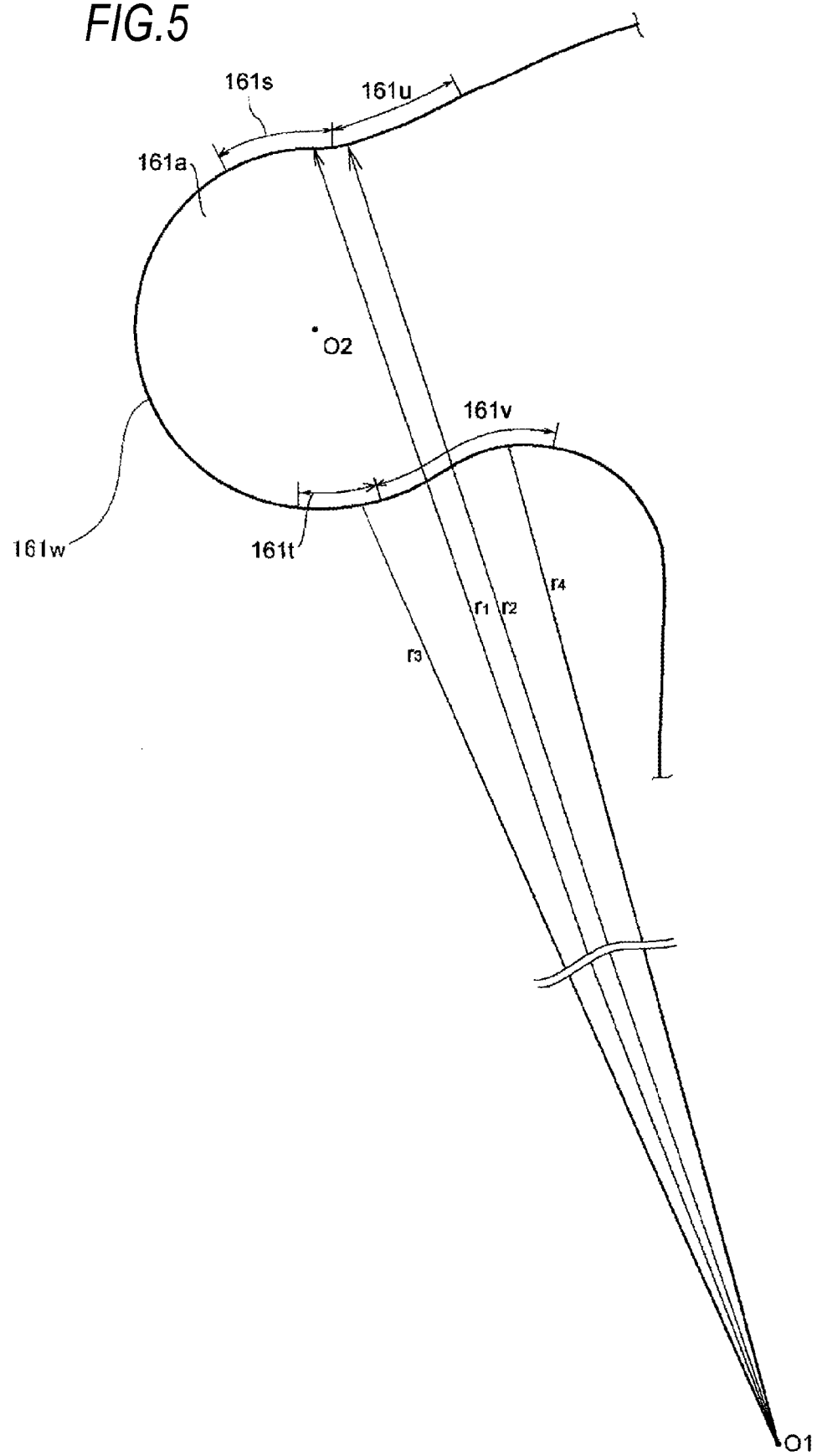
FIG. 5 is an enlarged view of a convex portion shown in FIG. 4.

As shown in FIGS. 4 and 5, the convex portion 161a of the pawl 161 has a first contact surface 161s and a second contact surface 161t. The first contact surface 161s can be brought into contact with the first stopper surface 157s. The second contact surface 161t can be brought into contact with the second stopper surface 157t. The first contact surface 161s and the second contact surface 161t are convex curved surfaces projected toward the concave portion 157d, as seen from the direction parallel to the rotation axes of the hook 157 and the pawl 161. As seen from the direction of the rotation axis, the first contact surface 161s is a convex curved surface projected toward the first stopper surface 157s and the second contact surface 161t is a convex curved surface projected toward the second stopper surface 157t.

Since the first stopper surface 157s and the second stopper surface 157t are planar surfaces, the radius of curvature thereof is infinite. Namely, the curvature of the first stopper surface 157s is set to be greater than that of the first contact surface 161s, and the curvature of the second stopper surface 157t is set to be greater than that of the second contact surface 161t.

In the present embodiment, a leading end portion of the convex portion 161a of the pawl 161 is configured by an arcuate surface centered on a center axis O2, as seen from the rotation axis direction. A portion of the arcuate surface is configured by the first contact surface 161s, the second contact surface 161t, and a top surface 161w (see FIG. 5) that connects the first contact surface 161s and the second contact surface 161t. Further, the second contact surface 161t is formed at a position close to a rotation center axis O1 of the pawl 161 than the first contact surface 161s.

In the present embodiment, the concave portion 157d has a connecting surface 157w (see FIGS. 2 and 3) that connects the first stopper surface 157s and the second stopper surface 157t.

As shown in FIG. 3, the convex portion 161a enters the concave portion 157d. When the first contact surface 161s is in contact with the first stopper surface 157s and the second contact surface 161t is in contact with the second stopper surface, further entry of the convex portion 161a into the concave portion 157d is stopped. In this state, the top surface 161w faces the connecting surface 157w without being in contact with the connecting surface 157w.

A first avoiding portion 161u having a concave shape is formed adjacent to the first contact surface 161s. The first avoiding portion 161u is set such that a distance r2 to the rotation center axis of the pawl 161 is set to be shorter than a distance r1 from the first contact surface 161s to the rotation center axis O1 of the pawl 161.

A second avoiding portion 161v is formed adjacent to the second contact surface 161t and has a concave shape. The second avoiding portion 161v is set such that a distance r4 to the rotation center axis of the pawl 161 is set to be longer than a distance r3 from the second contact surface 161t to the rotation center axis O1 of the pawl 161.

A first protrusion 151b, a second protrusion 151c, a third protrusion 151d and a stopper protrusion 151s, which are projected to the direction of the hook 157, are provided around the hole 151h on the front surface of the base 151. The hook 157 that rotates is supported at the top of at least three protrusions of these four protrusions. With respect to the dimensions in the rotation axis direction of the hook 157, a height from the front surface of the base 151 to the top of these four protrusions is set to be greater than a thickness of the spring 171.

The base 151 is provided with a hole 151j that penetrates through the base 151. As shown in FIG. 1, the hook 157 is provided with a protrusion 157e that is projected to the direction of the base 151. A height of the protrusion 157e is set to a height where the protrusion does not abut against the base 151. Moreover, the protrusion 157e is formed at a position in which the protrusion 157e can pass through above the hole 151j of the base 151 and can be abutted against the stopper protrusion 151s on the base 151 when the hook 157 is rotated in the direction of the arrow UL.

A fourth protrusion 151e, a fifth protrusion 151f and a sixth protrusion 151g, which are projected to the direction of the pawl 161, are also formed around the hole 151i on the front surface of the base 151. The pawl 161 that rotates is supported at the top of these three protrusions. For the dimensions in the rotation axis direction of the pawl 161, a height from the front surface of the base 151 to the top of these three protrusions is set to be greater than a thickness of the spring 173.

The base 151 is formed with a hole 151k that penetrates through the base 151. As shown in FIG. 1, the pawl 161 is formed with a protrusion 161e that is projected to the direction of the base 151. A height of the protrusion 161e is set to a height in which the protrusion does not abut against the base 151. Moreover, the protrusion 161e is formed at a position in which the protrusion 161e passes through above the hole 151k of the base 151 when the pawl 161 is rotated.

An inner end of the spring 171 is locked to the first protrusion 151b of the base 151, and an outer end thereof is locked to the protrusion 157e of the hook 157. The spring 171 urges the hook 157 in the unlocked position direction.

An inner end of the spring 173 is locked to the fourth protrusion 151e of the base 151, and an outer end thereof is locked to the protrusion 161e of the pawl 161. The spring 173 urges the pawl 161 in a direction to be pressed against the hook 157.

Next, an operation of the configuration described above will be described.

In the state of FIG. 3 where the hook 157 is in the locked position, the concave portion 157d and the convex portion 161a are engaged, and hence, the hook 157 is prohibited from rotating in the unlock direction. When the convex portion 161a is engaged with the concave portion 157d, the first contact surface 161s is in contact with the first stopper surface 157s and the second contact surface 161t is in contact with the second stopper surface 157t. In this state, the pawl 161 prohibits the rotation of the hook 157. This state is a locked state where the striker 153 is not able to be detached from the groove 157a of the hook 157.

Here, when the pawl 161 is rotated in the direction opposite to the direction of the arrow E against the elastic force of the spring 173, the pawl 161 is detached from the hook 157. Then, the engagement between the concave portion 157d and the convex portion 161a is released. The hook 157 is rotated in the unlocked position direction shown in FIG. 2 by the elastic force of the spring 171. In this way, the striker 153 is in the unlocked state where the striker can be detached from the groove 157a of the hook 157.

In the present embodiment, the stopper protrusion 151s is provided on the front surface of the base 151. When the protrusion 157e of the hook 157 that rotates in the unlocked position direction is abutted against the stopper protrusion 151s, further rotation of the hook 157 in the unlocked position direction is prohibited.

In the case of the unlocked state shown in FIG. 2, the hook 157 is rotated in the locked position direction against the elastic force of the spring 171 when a surface 157n in the vicinity of an opening of the groove 157a of the hook 157 is pressed by the striker 153. Then, the concave portion 157 is engaged with the convex portion 161a, and hence, the hook 157 is prohibited from rotating in the unlock direction. In this way, the locking device is in the locked state where the striker 153 is not able to be detached from the groove 157a of the hook 157.

Next, a method of assembling the locking device configured as described above will be described with reference to FIGS. 1 to 3.

First, the cylindrical portion 145a of the bushing 145 is inserted into the hole 151h from the back surface of the base 151. Further, the cylindrical portion 147a of the bushing 147 is inserted into the hole 151i from the back surface of the base 151. At this time, the cylindrical portion 145a and the cylindrical portion 147a are projected from the front surface of the base 151.

Subsequently, the spring 171 is placed on the front surface of the base 151 and the inner end of the spring 171 is locked to the first protrusion 151b. Further, in the state where the elastic force is generated in the spring 171, the outer end of the spring 171 is held by a rod-shaped jig that is inserted through a round hole 151j from the back surface of the base 151. Subsequently, the hook 157 is placed on the spring 171 and the jig is extracted. At this time, the outer end of the spring 171 is locked to the protrusion 157e of the hook 157.

Further, the spring 173 is placed on the front surface of the base 151, and the inner end of the spring 173 is locked to the fourth protrusion 151e. Further, in the state where the elastic force is generated in the spring 173, the outer end of the spring 173 is held by a rod-shaped jig that is inserted through a round hole 151k from the back surface of the base 151. Then, the pawl 161 is placed on the spring 173, and the jig is extracted. At this time, the outer end of the spring 173 is locked to the protrusion 161e of the pawl 161.

In this way, the locking device described above is obtained.

According to the above configuration, the following effects can be achieved.

(1) The hook 157 is provided with the concave portion 157d that has the first stopper surface 157s and the second stopper surface 157t, which extends in the rotation axis direction of the hook 157. The pawl 161 is provided with the convex portion 161a that has the first contact surface 161s that can be brought into contact with the first stopper surface 157s and the second contact surface 161t that can be brought into contact with the second stopper surface 157t. The first contact surface 161s and the second contact surface 161t are convex curved surfaces which are projected toward the concave portion 157d, as seen from the rotation axis direction of the hook 157 and the pawl 161.

Therefore, even when the variations in the dimensional accuracy or assembly accuracy of the hook 157 or the pawl 161 occur, the contact position between the first contact surface 161s and the first stopper surface 157s and the contact position between the second contact surface 161t and the second stopper surface 157t are hard to be changed.

For example, even when the convex portion 161a is greater than its original shape due to manufacturing error, since the first contact surface 161s and the second contact surface 161t are convex curved surfaces, the contact point between the first stopper surface 157s and the first contact surface 161s is hard to be deviated in a depth direction of the concave portion 157d.

On the contrary, unlike the present embodiment, for example, in the case where both the first stopper surface and the first contact surface are planar surfaces, the contact point between the first stopper surface and the first contact surface is significantly deviated to a shallow position when the convex portion to be engaged with the concave portion is greater than its original shape, due to manufacturing error, so that the engagement strength is greatly lowered.

For such reasons, variations in the engagement strength between the hook 157 and the pawl 161 are hard to occur.

(2) Incidentally, in a case where the first stopper surface 157s and the second stopper surface 157t are planar surfaces and the first contact surface 161s and the second contact surface 161t are arcuate surfaces, it is easy to form the convex portion 161a and the concave portion 157d. Further, with a simple shape, variations in the engagement strength between the hook 157 and the pawl 161 are hard to occur.

(3) Further, in the locking device of the present embodiment, the first stopper surface 157s and the second stopper surface 157t have curvatures, and the curvature of the first stopper surface 157s is greater than the curvature of the first contact surface 161s, and the curvature of the second stopper surface 157t is greater than the curvature of the second contact surface 161t.

Therefore, even when variations in the dimensional accuracy or assembly accuracy of the hook 157 or the pawl 161 occur, the contact position between the first contact surface 161s and the first stopper surface 157s and the contact position between the second contact surface 161t and the second stopper surface 157t are hard to be changed.

(4) As described above, the first stopper surface 157s is inclined with respect to the second stopper surface 157t such that the concave portion 157d is spread toward its opening.

The convex portion 161a can easily enter the concave portion 157d when the concave portion 157d is formed in such a shape. Further, variations in the engagement strength are liable to occur due to variations in the dimensional accuracy or the like when the concave portion 157d has such a shape. However, according to the present invention, for the reasons described above, it is possible to suppress the variations in the engagement strength.

(5) The second contact surface 161t is formed at a position close to the rotation axis of the pawl 161 than the first contact surface 161s. The first avoiding portion 161u is provided adjacent to the first contact surface 161s. The second avoiding portion 161v is provided adjacent to the second contact surface 161t.

The distance r2 from the rotation axis of the pawl 161 to the first avoiding portion 161u is shorter than the distance r1 from the rotation axis of the pawl 161 to the first contact surface 161s. The distance r4 from the rotation axis of the pawl 161 to the second avoiding portion 161v is longer than the distance r3 from the rotation axis of the pawl 161 to the second contact surface 161t.

Therefore, when the convex portion 161a is detached from the concave portion 157d, the portion of the pawl 161 other than the first contact surface 161s and the second contact surface 161t is hard to be brought into contact with the concave portion 157d of the hook 157, so that the convex portion 161a can be easily detached from the concave portion 157d.

(6) Further, in a case where the first avoid portion 161u and the second avoiding portion 161v are concave surfaces, it is possible to more reliably suppress the portion of the pawl 161 other than the first contact surface 161s and the second contact surface 161t from being brought into contact with the concave portion 157d of the hook 157.

(7) The concave portion 157d has the connecting surface 157w for connecting the first stopper surface 157s and the second stopper surface 157t. The convex portion 161a has the top surface 161w facing the connecting surface 157w. The connecting surface 157w and the top surface 161w have shapes that are not in contact with each other in the state where the first contact surface 161s is in contact with the first stopper surface 157s and the second contact surface 161t is in contact with the second stopper surface.

Therefore, according to the contact between the first contact surface 161s and the first stopper surface 157s and the contact between the second contact surface 161t and the second stopper surface, the engagement strength between the hook 157 and the pawl 161 is determined and the variations in the engagement strength are hard to occur.

(8) At this time, if the top surface 161w is a curved surface, the top surface 161w is hard to be brought into contact with the connecting surface 157w.

It is noted that the present invention is not limited to the above embodiments. The following modifications may be realized.

In the above-described embodiment, an example has been described in which the concave portion 157d is provided in the hook 157 and the convex portion 161a is provided in the pawl 161. However, the convex portion may be provided in the hook 157 and the concave portion may be provided in the pawl 161.

In the above-described embodiment, an example has been described in which the first stopper surface 157s and the second stopper surface 157t are planar surfaces. However, it may be a curved surface such as an arcuate surface, an elliptical surface, a parabolic surface, or may be a surface having fine irregularities.

Although an example has been described, in which a leading end portion of the convex portion 161a of the pawl 161 is an arcuate surface centered on the center axis O2 and a portion of the arcuate surface is the first contact surface 161s and the second contact surface 161t, a portion other than the first contact surface 161s and the second contact surface 161t may not be an arcuate surface.

Further, the first contact surface 161s and the second contact surface 161t may not be an arcuate surface centered on the center axis O2 that is common.

Although an example has been described, in which the first contact surface 161s and the second contact surface 161t are arcuate surfaces, the first contact surface and the second contact surface may have fine irregularities or may be a curved surface such as an elliptical surface or parabolic surface, other than the arcuate surface.

Although the first avoiding portion 161u and the second avoiding portion 161v have been formed in a concave shape, the present invention is not limited thereto. The first avoiding portion 161u and the second avoiding portion 161v may be configured as stepped portions adjacent to the first contact surface 161s and the second contact surface 161t.

Further, the shape of the concave portion 157d is not limited to those illustrated. For example, the concave portion may have any one of a shape where the connecting surface 157w is a planar surface, or a shape where the connecting surface is a curved surface, or a valley shape where the connecting surface is omitted and the first stopper surface 157s and the second stopper surface 157t are adjacent to each other. Further, the shape of the convex portion 161a is not limited to those illustrated. The convex portion may have a shape where the top surface 161w, which is located at a leading end than the first contact surface 161s and the second contact surface 161t, is a planar surface, a curved surface, or a polygonal surface.

In the above-described embodiment, an example has been described in which the curvature of the first stopper surface 157s and the curvature of the second stopper surface 157t are equal, the curvature of the first contact surface 161s and the curvature of the second contact surface 161t are equal, and the curvatures of the first stopper surface 157s and the second stopper surface 157t are greater than those of the first contact surface 161s and the second contact surfaced 161t. However, the present invention is not limited thereto.

For example, the curvature of the first stopper surface 157s, the curvature of the second stopper surface 157t, the curvature of the first contact surface 161s and the curvature of the second contact surface 161t may be set in descending order. Alternatively, the curvature of the first stopper surface 157s, the curvature of the first contact surface 161s, the curvature of the second stopper surface 157t, and the curvature of the second contact surface 161t may be set in descending order.

In the above-described embodiment, an example has been described in which the hook 157 and the pawl 161 are disposed on the front surface of the base 151 and the bushings 145 and 147 are inserted through the base 151 from the back surface. However, the present invention is not limited thereto. The hook 157 and the pawl 161 may be disposed on the front surface of the base 151 and the bushings 145 and 147 may be inserted through the base 151 via the hook 157 and the pawl 161 from the front surface.

The present application is based upon Japanese Patent Application (Patent Application No. 2013-030639) filed on Feb. 20, 2013, the contents of which are incorporated herein by reference.

REFERENCE NUMERALS LIST

151 Base
157 Hook
157d Concave Portion
157s First Stopper Surface
157t Second Stopper Surface
161 Pawl
161a Convex Portion
161s First Contact Surface
161t Second Contact Surface
161u First Avoiding Portion
161v Second Avoiding Portion
171, 173 Spring

What is claimed is:
1. A locking device comprising:
a base;
a hook provided on the base so as to be rotatable around a rotation axis; and
a pawl provided on the base so as to be rotatable around an axis parallel to the rotation axis,
wherein the hook has a groove into which a striker is able to enter, the hook is rotatable from an unlocked position where the striker is able to enter the groove to a locked position where the striker is prohibited from being detached from the groove, and the hook is pressed in the unlocked position direction, wherein the pawl prohibits the rotation of the hook by being in contact with the hook located in the locked position, and the pawl is pressed in a direction to be urged against the hook, wherein a concave portion is provided in one of the hook and the pawl and has a first stopper surface and a second stopper surface facing the first stopper surface which are extending in the rotation axis direction, wherein a convex portion is provided in the other of the hook and the pawl and has a first contact surface that can be brought into contact with the first stopper surface and a second contact surface that can be brought into contact with the second stopper surface, wherein when the convex portion enters the concave portion, the first contact surface is brought into contact with the first stopper surface and the second contact surface is brought into contact with the second stopper surface, so that the rotation of the hook is prohibited by the pawl, and wherein the first contact surface is a convex curved surface projected toward the first stopper surface, and the second contact surface is a convex curved surface projected toward the second stopper surface, as seen from the rotation axis direction, wherein the second contact surface is formed at a position close to the rotation axis of the other of the hook and the pawl than the first contact surface, wherein a first avoiding portion is provided adjacent to the first contact surface, wherein a second avoiding portion is provided adjacent to the second contact surface, wherein a distance from the rotation axis of the other of the hook and the pawl to the first avoiding portion is shorter than a distance from the rotation axis of the other of the hook and the pawl to the first contact surface, and wherein a distance from the rotation axis of the other of the hook and the pawl to the second avoiding portion is longer than a distance from the rotation axis of the other of the hook and the pawl to the second contact surface.

2. The locking device according to claim 1,
wherein the first stopper surface and the second stopper surface are planar surfaces, and
wherein the first contact surface and the second contact surface are arcuate surfaces.

3. The locking device according to claim 1,
wherein the first stopper surface has a curvature, and the curvature of the first stopper surface is greater than a curvature of the first contact surface, and
wherein the second stopper surface has a curvature, and the curvature of the second stopper surface is greater than a curvature of the second contact surface.

4. The locking device according to claim 1,
wherein the first stopper surface is inclined with respect to the second stopper surface such that the concave portion is spread toward its opening.

5. The locking device according to claim 1,
wherein the first avoiding portion and the second avoiding portion are concave surfaces.

6. The locking device according to claim 1,
wherein the concave portion has a connecting surface for connecting the first stopper surface and the second stopper surface,
wherein the convex portion has a top surface facing the connecting surface, and
wherein the connecting surface and the top surface have shapes that are not in contact with each other in the state where the first contact surface is in contact with the first stopper surface and the second contact surface is in contact with the second stopper surface.

7. The locking device according to claim 6, wherein the top surface is a curved surface.

* * * * *